Fig. 1

INVENTOR.
LEONARD T. COOKSON

July 2, 1957 L. T. COOKSON 2,797,541
BOTTLE STOPPERING APPARATUS
Filed Dec. 26, 1951 5 Sheets-Sheet 3

INVENTOR.
LEONARD T. COOKSON
BY
ATTORNEY

INVENTOR.
LEONARD T. COOKSON
BY
ATTORNEY

INVENTOR.
LEONARD T. COOKSON
BY
ATTORNEY

United States Patent Office 2,797,541
Patented July 2, 1957

2,797,541

BOTTLE STOPPERING APPARATUS

Leonard T. Cookson, Kalamazoo, Mich., assignor to The Upjohn Company, Kalamazoo, Mich., a corporation of Michigan Application December 26, 1951, Serial No. 263,439

36 Claims. (Cl. 53—306)

This invention relates to bottle stoppering apparatus and particularly to a type thereof utilizing a vibratory type of conveyor and providing means for ramming rubber, or other resilient, stoppers directly from said conveyor into the neck of a bottle without the use of other moving apparatus.

Bottle stoppering apparatus has been used in a wide number of industries for a great many years. Industries, such as those dealing with pharmaceuticals, bottled beverages and milk, require the highest possible degree of both cleanliness and automatic operation and many machines have been developed to meet these requirements. The use of a vertically reciprocating ram for driving a stopper into a bottle has long been well known. However, the apparatus by which stoppers have been fed to the vicinity of the ram, and the mechanism by which stoppers have been held under the ram for driving into a bottle, have varied widely. Literally hundreds of devices have been proposed for this purpose and have been used. However, they have all, insofar as I am aware, involved a greater or lesser number of moving parts, some of them being delicately adjustable moving parts.

The problem has been particularly acute for several years in the pharmaceutical industry in the use of rubber stoppers. The use of rubber stoppers raises two problems not encountered by the industry in its previous use of cork and metal stoppers. Rubber has a much higher coefficient of friction than does either cork or metal but, worse, its co-efficient of friction does not appear to be sufficiently uniform from one individual stopper to another to allow for precise control over the sliding of the rubber stopper along a metal surface. Thus, various types of sliding feeds, such as chutes, have had a great deal of trouble with stoppers spasmodically sticking to the chutes unless the chute is placed at such a steep angle that other problems were introduced. Further, the resiliency of the rubber has often made it difficult to handle by conventional apparatus inasmuch as a gripping or grasping of the stopper by conventional apparatus was not as positive as it would be with cork or metal and this often gave rise to inaccuracies of operation and occasional failure of operation.

These stoppers normally have a generally cylindrical, though slightly downwardly tapering, body part and have a sidewardly extending flange at the upper end thereof. The upper end of the body part and said flange together define substantially a planar surface. This shape, in addition to the other difficulties above mentioned with respect to rubber stoppers, makes much of the previous bottle stoppering equipment inapplicable for use here.

Therefore, it has long been desirable to provide a device for feeding stoppers which will have a minimum of moving parts and which will be capable of accurately and efficiently handling resilient rubber stoppers.

Accordingly, a principal object of the invention is to provide a bottle stoppering device of the ram type having a minimum number of moving parts.

A further object of the invention is to provide a bottle stoppering device, as aforesaid, having a live feed for said stoppers.

A further object of the invention has been to provide a bottle stopper feeding device, as aforesaid, of maximum structural simplicity.

A further object of the invention has been to provide a stopper feeding device, as aforesaid, capable of handling resilient rubber stoppers.

A further object of the invention has been to provide a stopper feeding device, as aforesaid, which is efficient and reliable in operation.

A further object of the invention has been to provide a stopper feeding device, as aforesaid, which will be sturdy and capable of continuous use with a minimum of maintenance requirements.

Other objects and purposes of the invention will be apparent to persons acquainted with apparatus of this general type upon reading the following disclosure and inspection of the accompanying drawings.

*General description*

In general, my invention comprises a chute having a slotted bottom for receiving the stoppers in such a manner that the body parts of the stoppers extend through said slot and the stoppers are supported in said chute by their radially extending flanges. The chute is placed at an angle with respect to the horizontal and the upper end is continuously vibrated as stoppers are fed thereinto. A receiver which is stationary with respect to the frame of the machine receives the lower end of said chute and permits same to follow somewhat the vibrations imparted to the upper end thereof. The stoppers are discharged from the lower end of the chute into said receiver. A ram is placed above said receiver and is supported for vertical reciprocation. As a bottle comes into position below said receiver, said ram is moved downwardly to strike a stopper, pressing it downwardly through and past said receiver and into said bottle. The upper end of the bottle must be so spaced from the bottom of said receiver that the lower end of the stopper enters into the neck of the bottle before it is released from the guidance of the receiver.

Detailed description

Figure 1:
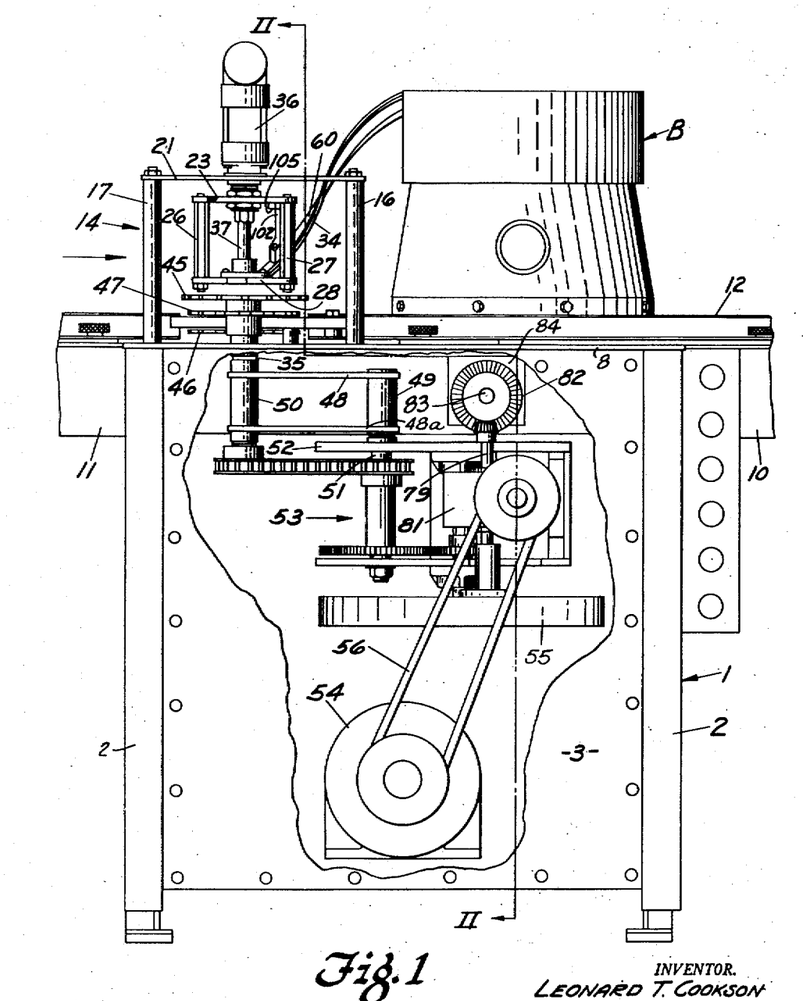
Figure 1 shows a side elevation, partially broken, view of a specific embodiment of my invention.

For convenience in reference, and with no intent to limit, the terms "upwardly" and "downwardly" or derivatives thereof, will refer to directions with respect to the machine or parts of the machine in its normal position of use. The terms "forwardly" and "rearwardly" will refer to the direction of travel of a bottle moving through the apparatus which, as appearing in Figure 1, is in this embodiment from right to left. The terms "laterally" or "transversely" or derivatives and synonyms thereof, will refer to directions perpendicular to the longitudinal extent of the conveyor.

Figures 2, 14:
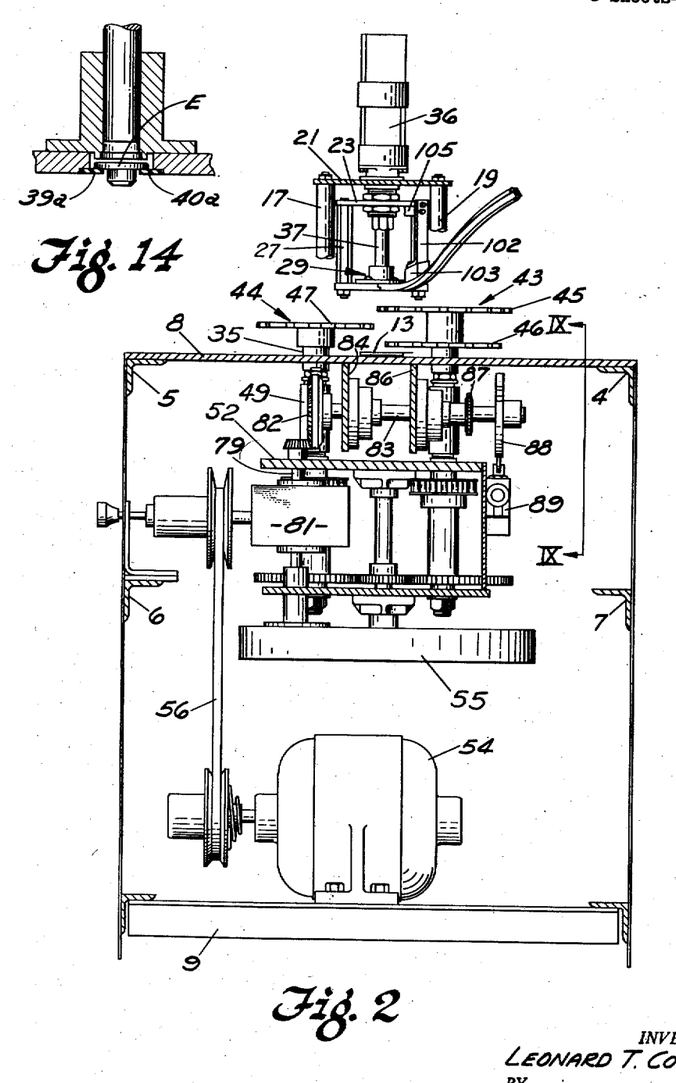
Figure 2 shows partially broken, sectional view substantially as taken on the line II—II of Figure 1.
Figure 14 is a section similar to a fragment of Figure 7 and showing a modification.

Referring first to Figure 1 there is shown a support frame structure 1 comprising vertically disposed legs 2, a side covering sheet 3 and (Figure 2) longitudinal angles 4, 5, 6, and 7. A cover sheet 8 closes the top of the support structure. A pair of lateral frame members, of which one is shown at 9, completes the support structure. Longitudinally extending members 10 and 11 (Figure 1) extend any convenient distance, not shown, from their respective ends of the bottle stopping mechanism and support a conveyor.

Figure 3:
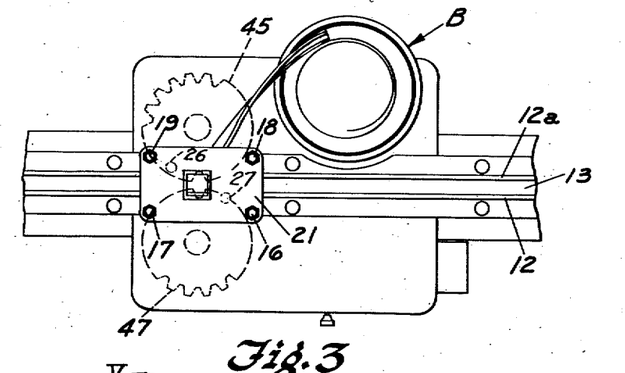
Figure 3 shows a fragmentary top view of the apparatus shown in Figure 1.

Said conveyor comprises a pair of spaced conveyor guides 12 and 12a (Figures 3 and 4) which are spaced apart sufficiently to permit bottles of a selected size to pass easily between them but without material lateral movement. A conveyor belt 13 is disposed between and below said guides and is driven continuously by any convenient means.

The bottle stoppering section 14 (Figure 1) is placed at a convenient point on the support frame structure 1 and is composed of parts now to be described. The bottle stoppering section 14 consists first of four upstanding posts 16, 17, 18 and 19 (Figures 1, 2 and 3), the same being supported in any convenient manner upon the cover sheet 8 and in turn supporting a plate 21.

Figures 6, 8, 9, 10, 12:
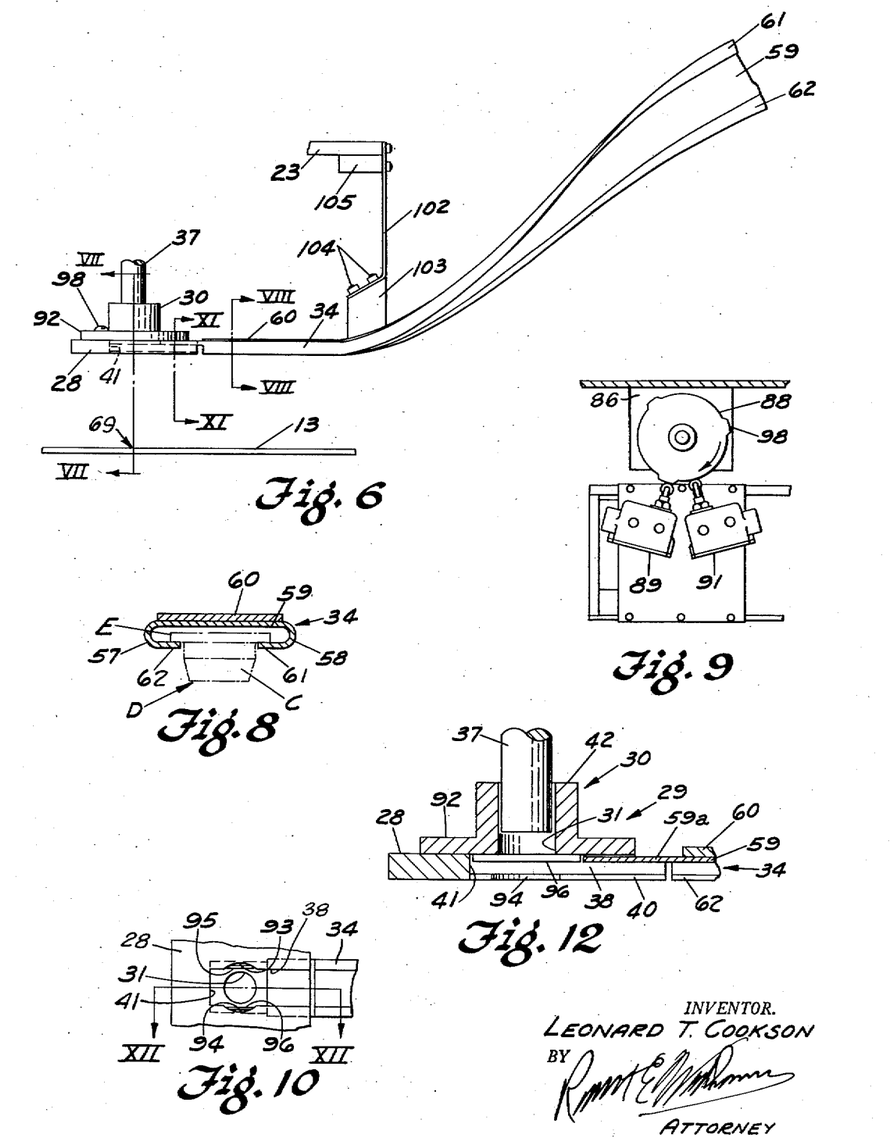
Figure 6 is a detail of the ram, chute and conveyor, showing their relationship and omitting other parts.
Figure 8 is a section taken on the line VIII—VIII of Figure 6.
Figure 9 is a section taken on the line IX—IX of Figure 2.
Figure 10 is a fragmentary view of the end of the conveyor chute taken from the underside thereof.
Figure 12 is a sectional view taken on line XII—XII of either Figure 7 or Figure 10.
Figures 7, 11, 13:
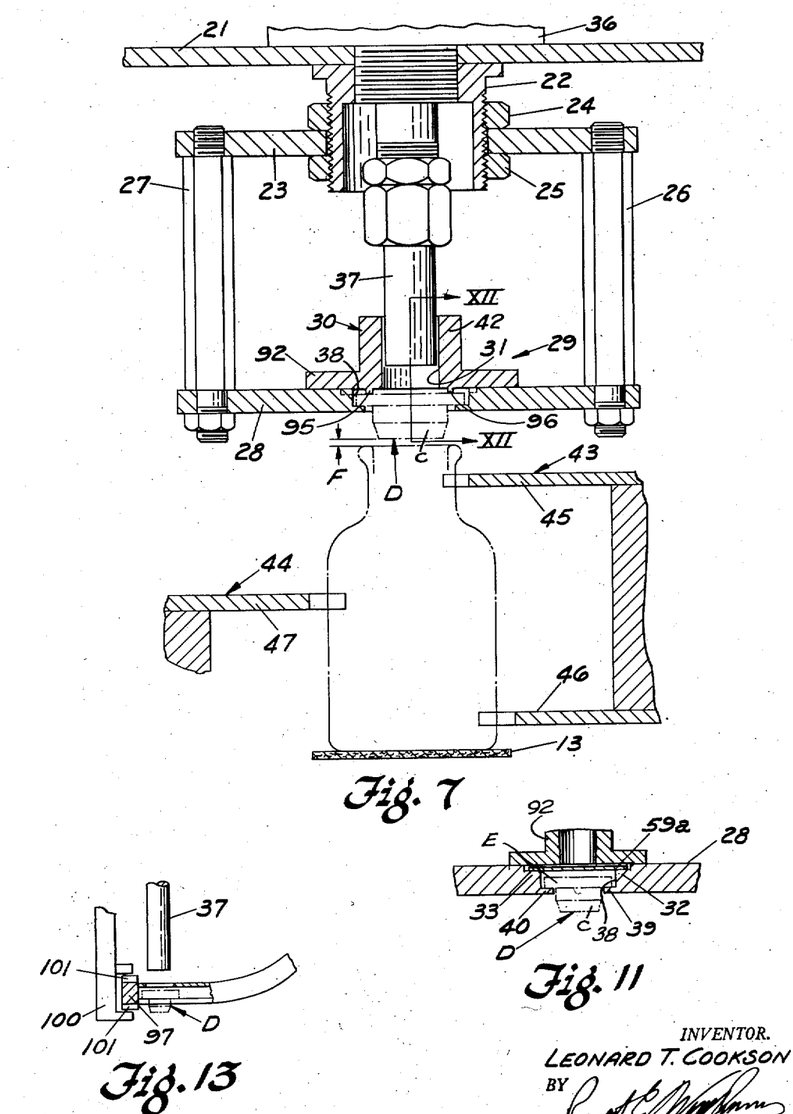
Figure 7 is a section substantially as taken on the line VII—VII of Figure 6 but showing in addition other associated parts.
Figure 11 is a sectional view taken on line XI—XI of Figure 6.
Figure 13 is a view similar to Figure 6 and showing a modification.

Referring now to Figure 7, there is shown a downwardly extending, externally threaded, tubular member 22 depending in any convenient manner from the supporting plate 21. An upper bracket plate 23 surrounds and is supported by said tubular member 22 and is held in adjusted position thereon by the nuts 24 and 25. A pair of hangers 26 and 27 extend downwardly, respectively, from each end of said upper bracket plate 23 and support a lower bracket plate 28. The lower end of the chute 34 (Figure 1) is received into the lower bracket plate 28 at a point intermediate its ends. A ram guide 30 (Figures 6 and 7) is supported on and by said lower bracket plate 28 immediately above the portion of said lower bracket plate adjacent the end of said chute 34. Said ram guide, together with the portion of said lower bracket plate 28 which supports said chute 34 and which supports said ram guide 30 may collectively be designated as a receiver 29. Aligned openings, hereinafter identified and described in detail, extending through said receiver 29 are provided for the hereinafter mentioned ram as set forth in further detail below. Adjustment of the nuts 24 and 25 upwardly or downwardly will adjust the vertical position of the receiver 29 with respect to the conveyor as desired.

Directly above the tubular member 22 is mounted a pressure fluid, as air, actuated cylinder 36 which is supported by the plate 21 and which in turn supports and operates the ram 37. Said cylinder and ram are so positioned that the axis of said ram will intersect the center line of said conveyor.

The upper end of the chute 34 is supported and fed by any convenient commercial form of vibratory feeder B, such as a device commercially known as "Syntron" Vibratory Elevator, manufactured by the Syntron Company, of Homer City, Pa., and illustrated by United States Patent Nos. 2,305,943, 2,187,717 and 2,464,216.

A pair of metering devices 43 and 44 (Figures 2 and 4) are arranged on either side of the conveyor in such position with respect thereto that a line A connecting the center lines of said metering devices will intersect the projected axis of the ram. The station point 69 located by the intersection of the center line of the conveyor and the line A connecting the axes of the metering devices 43 and 44 is the point at which the center of a bottle is located when the ram 37 moves downwardly.

Figure 4:
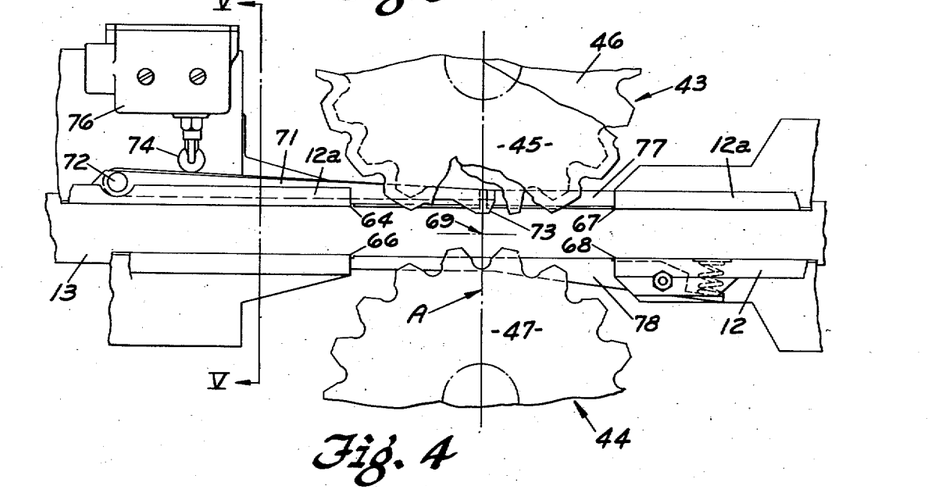
Figure 4 is a detail of the conveyor structure immediately below the ram and showing certain control features.
Figure 5:
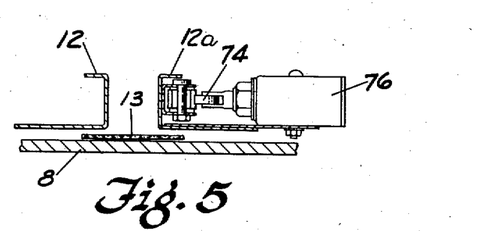
Figure 5 is a section taken on the line V—V of Figure 4 and rotated 90 degrees clockwise.

Said metering device 43 in this embodiment comprises upper and lower star wheels 45 and 46 arranged one above the other with the star wheel 45 preferably arranged to engage the neck of a bottle (Figure 7), and the metering device 44 in this embodiment comprises a single star wheel 47 positioned vertically intermediate the star wheels 45 and 46. These star wheels are of such size and shape that, as shown in Figures 4 and 7, when suitably actuated, they will engage a bottle approaching same on the conveyor, carry it to a position under said ram 37, hold it there for insertion of a stopper and then move it onwardly and release said bottle to resume movement by said conveyor.

The metering device 44 is supported upon a convenient shaft 35 and this in turn is mounted in a bearing 50 (Figure 1). Said bearing is supported on a pair of arms 48 and 48a which are in turn mounted on and by a bearing 49 onto a shaft 51. Said bearing 49 is supported on and by plate 52. Similar structure is provided for supporting the metering device 43 on the other side of the conveyor.

Any convenient mechanism, generally indicated at 53 in Figure 1, such as the mechanism described and claimed in my co-pending application Serial No. 263,440, now United States Patent No. 2,660,354, filed concurrently herewith, may be provided for simultaneously driving said shaft 51, and its counter-part on the other side of the mechanism, at equal speeds and speeds which are closely correlated with the rate of movement of the conveyor. Said driving mechanism 53 is driven by any convenient agency such as a motor 54 acting through a belt 56. Said driving mechanism 53 may be of any known type delivering a reliable and accurately controllable motion to the star wheels, and may advantageously employ a Geneva mechanism 55 as shown in my said co-pending application.

Turning now to Figures 6 and 8, it will be observed that the chute 34 throughout the greater part of its length comprises a single sheet of metal bent to define a pair of sides 57 and 58, a top 59 connecting said sides and a pair of stopper supporting flanges 61 and 62 which are substantially co-planar with each other and extend toward each other. The space between the opposed edges of said flanges is sometimes herein referred to as a slot in the bottom of said chute but it will be apparent that the chute may be constructed in a variety of ways providing only that said slot is large enough, as best shown in Figure 8, to permit the shank, or body part, C of the stopper D to extend therethrough with enough clearance to permit easy travel of said stopper along said chute. The sidewardly extending, annular flange E of said stopper is supported on said supporting flanges 61 and 62, said sides 57 and 58 of the chute being sufficiently far apart to permit said stopper flange C to fit therebetween with sufficient clearance to enable it to move easily therealong but without permitting material lateral motion.

Said chute 34 (Figure 8) is constructed with sufficient stiffness that vibratory impulses applied to the upper end thereof will extend substantially throughout the full length of said chute or, as a matter of convenience, the same result may be secured by fastening a relatively heavy reinforcing strip 60 to the top 59 of the chute. The bottom of said chute, as shown in Figure 6, is spaced sufficiently above the upper surface of the conveyor belt 13, having in mind the height of the bottle and the distance that the shank C of the stopper hangs below the underside of said bottom portion of said chute, that said stopper so held will just clear the upper end of a bottle. The clearance, as indicated at F in Figure 7, should be as little as possible while assuring that the stoppers to be used will all clear the bottles. In any event, the clearance F should be (1) sufficiently small that as a given stopper is pushed by the ram 37 through the slot in the chute 34 and into a bottle, the shank C of the stopper will enter substantially into the neck of the bottle while the flange of the stopper is still firmly held by the supporting flanges 61 and 62 of the chute and (2) sufficiently great that when the stopper is firmly seated in the neck of the bottle the stopper flange will have completely cleared the chute flanges. These distances will vary widely with stoppers of different lengths, body diameters, flange diameters, flange thicknesses and materials, but by way of illustration the following example of satisfactory design is mentioned:

|  | Example 1 | Example 2 |
| --- | --- | --- |
| Shank length | 0.221 | 0.168. |
| Maximum shank diameter | 0.513 | 0.295. |
| Flange thickness | 0.135 | 0.078. |
| Flange diameter | 0.750 | 0.495. |
| Material | Rubber | Rubber. |
| Clearance at F (Figure 7) | 1/32" approximately. | 1/32" approximately. |

Now returning to the receiver 29 and considering it in greater detail, on the side of the lower bracket plate 28 facing the chute 34 and intermediate the ends of said plate there is an opening 38 (Figures 7, 10 and 12) for receiving stoppers from said chute and delivering them to a position under the ram 37. Said opening has notch portions 32 and 33 (Figure 11) for receiving an extending part 59a of the top element 59 of said chute whereby said chute is held in position for the traveling of said stoppers from the chute into said opening 38. However, said notch portions 32 and 33 are made sufficiently wider and longer than said extending part 59a that the vibratory motion of said chute with respect to the frame of the machine will not be materially diminished.

The lower portion of said opening 38 contains a pair of lips 39 and 40 which are aligned with the lips 61 and 62, respectively, of the chute 34 for supporting a stopper by its flange E, as shown in Figure 11, in the same manner that said stopper is supported by said chute. Said opening 38 terminates in a wall 41 by which the travel of said stoppers is so limited with respect to the point 68 that a stopper whose flange E is contacting said wall will be co-axial with a bottle positioned on a station point 69 that a stopper whose flange E is contacting said provided in said lips 39 and 40 to assist in permitting the stopper to pass freely downwardly past said lips with a minimum of interference.

The ram guide 30 (Figures 7 and 12) has a guide collar 42 and a fastening flange 92. It is mounted by screws, of which one is shown at 98 in Figure 6, through said flange to the lower bracket plate 28. An internal opening 31 in said guide collar 42 is positioned over the opening 38 of said lower bracket plate and is so positioned with respect to the metering devices 43 and 44 that the projected axis of said ram 37 will pass through the point 69 intermediate the said metering devices and it is further so positioned with respect to the wall 41 that the ram, on descending, will strike the center of a stopper whose flange is touching said wall. Ribs 95 and 96 (Figures 7 and 12) extend below said ram guide 30 such a distance that their lower surfaces are substantially co-planar with the lower surface of the extension 59a and thereby provide continuity of guiding for the stoppers and prevent any possible upward displacement of a stopper. Thus, it will be seen that the chute 34 and the receiver 29 together constitute feeding means, which, in cooperation with the vibratory feeder delivers a continuous supply of stoppers to a point below said ram.

Turning now to Figure 4, here is shown a preferred embodiment of means for assuring the accurate guidance of said bottles and for initiating the downward movement of the ram. The spaced conveyor guides 12 and 12a at each of the forward and rearward ends of the device terminate at points 64, 66, 67 and 68 which are sufficiently spaced from each other to permit the metering devices 43 and 44 to enter therebetween and to extend a short distance across the conveyor. An arm 71 is pivoted to a portion of the conveyor guide 12a at 72 and has a cam end 73 extending into the path of, and movable by, the bottle for moving the roller 74 and thereby actuating the micro-switch 76 when the bottle is in its stopper receiving position. Removable guides 77 and 78, which may be removably located by a sliding fit, as in the case of the guide 77, or may be pivotally held in normally closed position by a spring, as in the case of guide 78, are provided to assure accurate guidance of the bottles into the recesses of the star wheels.

The shaft 79 (Figure 1) extends upwardly from the gear box 81, which gear box also drives the star wheel driving mechanism 53, and drives the bevel gear 82. Said bevel gear 82 rotates a shaft 83 (Figure 2), said shaft being supported by the brackets 84 and 86, and thereby drives a sprocket 87 from which, by any conventional means not shown, is driven the conveyor belt 13. The shaft 83 carries and rotates a cam 88 (Figures 2 and 9) which actuates the micro-switches 89 and 91 for purposes appearing hereinafter.

In the preferred embodiment here illustrated, it is desirable, though not essential, to improve the support of the lower end of the chute 34 by providing a substantially vertically disposed spring 102 (Figures 1, 2 and 6) depending from a block 105 which in turn is supported from the upper bracket plate 23. Said spring 102 supports a block 103 by the screws 104 and said block is brazed, or otherwise fastened, to the chute 34 at a point adjacent its lower end. While this spring and its function can be omitted in some circumstances, its use as shown will diminish vibration noise and will improve the feeding of stoppers to the receiver.

*Operation*

The operation of the machine is fully automatic and it requires only the delivery to one end of the conveyor of a continuous supply of bottles, which bottles are preferably, but not necessarily, substantially touching each other as they are arranged on the conveyor belt 13. Said one end of the conveyor is in this embodiment the rightward end as seen in Figure 1, but in view of the foregoing it will be evident that either end may be the feeding end. As said apparatus is in normal running condition, the motor 54 is in continuous operation at a constant speed and drives the bevel gear 82 and by it the sprocket 87 at a constant speed which moves the conveyor belt 13 along the cover sheet 8 at a constant speed. The star wheels are rotated at the same speed with respect to each other but are rotated intermittently so that a bottle will be moved onto the point 69 and there held momentarily while the ram moves downwardly.

Concurrently, a supply of stoppers is being fed from the "Syntron" B into the upper end of chute 34 and the upper end of said chute is simultaneously vibrated through an oscillatory path so that said stoppers move steadily and at a controlled speed along said chute toward the lower end thereof. The rate at which stoppers move through the chute into the receiver and against said wall 41 (Figures 6 and 12) is adjusted to be sufficiently rapid with respect to the frequency of reciprocation of said ram, and the rate of metering of bottles, that a stopper will be against the wall 41 each time the ram descends. As a stopper reaches the wall 41, its axis will coincide with the projected axis of both the ram 37 and of a bottle being held by the star wheels in position on the point 69. The ram now moves downwardly to engage said stopper and thereby to push it downwardly toward the bottle. As the stopper moves downwardly a relatively short distance, the lower end of its shank C will enter into the opening in the neck of the bottle while still being supported and guided by the flange E. Said flange will, however, bend to permit said stopper to move downwardly under the influence of the ram. As the ram moves on downwardly, the flange E bends sufficiently further to permit the stopper to escape from the chute. By the time the stopper is fully seated in the bottle, the edges of the flange E are then fully past the opposed surfaces of the lips 39 and 40 and the stopper flange E then snaps down to its normal position. The cutouts 93 and 94 (Figure 10), where used, assist in effecting release of the stopper flange at the proper time with respect to its becoming seated in and on the bottle.

The timing of these various operations may be performed by a variety of conventional mechanisms which can, in view of the foregoing, be supplied by any person skilled in the art. However, in this particular embodiment, there are shown certain timing and control devices which are particularly well adapted to controlling the mechanism shown.

The lobes 98 (Figure 9) of the cam 88 are so related to the star wheels that, when said star wheels stop, one of said lobes will have engaged the roller of the micro-switch 91 and closed same. The micro-switch 76 (Figure 4) is in series with the micro-switch 91 and, if a bottle is at the point 69 then the micro-switch 76 is also actuated to close the circuit. If both of said switches close, then by any convenient electric and pressure fluid circuitry, not shown, the ram cylinder 36 is actuated and the ram plunger moves downwardly. The lobe 98 then leaves the micro-switch 91 and moves on to close the micro-switch 89. This cuts off the flow of pressure fluid to said cylinder 36 and the ram is returned upwardly, either by upwardly acting fluid pressure or by a spring as convenient. In this way, the ram, regardless of whether a stopper is properly inserted into a bottle or not, is moved upwardly out of the way of subsequent stoppers before the star wheels again move.

From an inspection of the drawings, especially Figures 7 and 8, and a consideration of the operation of the apparatus it will be obvious that with a resilient stopper and rigid supporting flanges 61 and 62, the ram 37 is preferably of a diameter which is as great as possible but not materially greater than the width of the slot between said supporting flanges minus twice the thickness of the stopper flange.

Figure 13 illustrates a modification of the apparatus in which the receiver 29 (Figure 12) is eliminated and a part of its functions performed by the end of the chute 34 which is extended under the ram and closed by a stop 97 to constitute the feeding means. A bracket 100 is mounted rigidly with respect to the frame of the machine and supports the end of said chute by the ribs 101. The ribs are of resilient material and permit sufficient vibratory motion in the chute to extend to the lower, or discharge, end thereof to effect the sufficient live feed for some uses throughout the length of the conveyor.

While a "Syntron" has been given as an acceptable example of a vibratory type of feeder, it will be recognized that any means by which the chute 34 is subjected to a vertical and horizontal oscillatory, high frequency, vibration and stoppers are continuously fed thereinto will work in the same manner as above set forth insofar as the bottle stoppering mechanism is concerned.

The conveyor has been above indicated as running continuously, but it will be appreciated that it is entirely possible, if desirable, to operate the conveyor intermittently in the same manner as the star wheels. However, it is preferable to run it continuously in order that the bottles will be in contact with each other and will come into contact with the star wheels when same are stationary regardless of the manner in which they are fed to the conveyor. In this way, the supply of bottles to the star wheels is more reliable and there is less likely to be a vacancy in the space where a bottle should be during each dwell of the star wheels.

While said stoppers have throughout been described as comprised of a resilient material, as rubber, it will be understood that by making the lips 39a and 40a of a resilient material (Figure 14) the stopper flange E may be relatively rigid. Thus, it is only necessary that there be sufficient resiliency in either, or both, of the stopper flange E or the lips 39 and 40, to permit the stopper flange E to pass said lips without undesirable permanent distortion of either thereof.

It will be thus recognized that I have described and illustrated a device fully accomplishing the objects and the purposes of the invention as set forth above.

It should be understood that the specific embodiment here illustrated constitutes one preferred embodiment for carrying out the principles of my invention but that said structure herein disclosed may be varied in a variety of ways without departing from the scope of the invention and that, accordingly, the hereinafter appended claims should be interpreted to include such variations excepting as said claims by their own terms expressly require otherwise.

I claim:

1. In a device for automatically inserting stoppers into successive bottles, which stoppers each have a laterally extending cap-like resiliently flexible flange at their upper ends, said bottles being fed successively to a station point, the combination comprising: an elongated, trough-like feeding means having an elongated slot intermediate a pair of parallel supporting flanges, said feeding means having a feeding end and a discharge end and said feeding means having a stop closing the end of said slot at its discharge end; means feeding stoppers serially into the feeding end of said feeding means in such a manner that said stoppers are supported by their flanges on said supporting flanges and the body parts of said stoppers extend through said elongated slot; a reciprocable ram positioned with its axis passing through said station point and adjacent the stop at the discharge end of said feeding means and above said elongated slot, said ram being of substantially the diameter of the body part of one of said stoppers but less than the width of that portion of said slot directly opposite said ram; whereby with a stopper supported on its flange by said supporting flanges and positioned coaxially with a bottle, the ram in moving coaxially toward said bottle will engage the upper end of said stopper and will drive it off and past said supporting flanges and into said bottle, the ram passing between said supporting flanges, and the flanges of the stopper being distorted, as the ram drives the stopper off and past said supporting flanges.

2. In a device for automatically inserting stoppers into successive bottles, said stoppers each having a laterally extending cap-like resiliently flexible flange at their upper ends, said bottles being fed successively to a station point the combination comprising: an elongated, trough-like feeding means having a pair of substantially rigid supporting flanges defining an elongated slot, said feeding means being inclined downwardly through one portion thereof and having its lower end positioned substantially horizontally, said feeding means having a stop closing the end of said slot at its lower end; means feeding stoppers serially into said feeding means in such a manner that said stoppers are supported by their respective flanges on said supporting flanges and the body part of said stoppers extend through said elongated slot; means for continuously imparting vibration to said feeding means; a reciprocable ram positioned with its axis passing through said station point and adjacent the stop at the lower end of said feeding means and above said elongated slot, said ram being of substantially the diameter of the body part of one of said stoppers but less than the width of that portion of said slot directly opposite said ram; whereby a stopper can be conducted along said chute to a position in alignment with the mouth of a selected bottle and the ram can push said stopper from said chute directly into said bottle, the flanges of said stopper yielding under pressure from the ram to permit said stopper to be pushed past said supporting flanges and into said bottle.

3. In a device for automatically inserting stoppers into successive bottles, said stoppers each having a laterally extending cap-like resiliently flexible flange at their upper ends, said bottles being fed successively to a station point, the combination comprising: an elongated, trough-like feeding means having a pair of substantially rigid supporting flanges defining an elongated slot, said feeding means having a feeding end and a discharge end and having a stop closing the end of said slot at its discharge end; means for feeding stoppers serially into the feeding end of said feeding means in such a manner that said stoppers are supported by their flanges on said supporting flanges of said feeding means and the body parts of said stoppers extend through said elongated slot; a reciprocable ram positioned with its axis passing through said station point and adjacent the stop at the discharge end of said feeding means and opposite said elongated slot, said ram being of substantially the diameter of the body part of one of said stoppers but less than the width of said slot; a support for a bottle to be stoppered, said support being spaced below the bottom of said feeding means a distance equal to the height of the bottle plus a clearance distance which is greater than the distance body parts of said stoppers extend below said feeding means but which clearance distance is less than the distance said stoppers extend below the bottom of said feeding means when they are pushed by said ram sufficiently through said slot that they are no longer effectively guided by it; whereby a stopper can be conducted along said chute to a position in alignment with the mouth of a selected bottle and the ram can push said stopper from said chute directly into said bottle, the flanges of said stopper yielding under pressure from the ram to permit said stopper to be pushed past said supporting flanges and into said bottle.

4. In a device for automatically inserting stoppers into successive bottles, said stoppers each having a laterally extending, cap-like resiliently flexible flange at their upper ends, said bottles being fed successively to a station point, the combination comprising: feeding means comprising a pair of U-shaped substantially rigid channels having their flanges extending toward each other and a stop at the lower end thereof; means supporting said bottles successively on said station point under the lower end of said feeding means; means supporting said feeding means at such a distance from said bottle supporting means that a stopper being supported on the lower flanges of said feeding means will clear said bottle but which distance is less than the distance said stoppers extend below the lower end of said feeding means when they are pushed by said ram sufficiently through said slot that they are no longer effectively guided by it; means for introducing stoppers serially into said feeding means in such a manner that said stoppers are supported by their flanges on the lower end of said feeding means and the body parts of said stoppers extend through said elongated slot; a vertically reciprocable ram positioned with its axis passing through said station point adjacent the stop at the lower end of said feeding means and above said elongated slot, said ram being of substantially the diameter of the body part of one of said stoppers but less than the width of said slot; whereby a stopper can be conducted along said chute to a position in alignment with the mouth of a selected bottle and the ram can push said stopper from said chute directly into said bottle, the flanges of said stopper yielding under pressure from the ram to permit said stopper to be pushed past said supporting flanges and into said bottle.

5. In a device for automatically inserting stoppers comprised of a resilient material, and each having a laterally extending, cap-like flange spaced above the lower end of its body, into successive bottles, the combination comprising: a frame; a horizontally movable conveyor supported by said frame; an inclined, elongated, feeding means having a substantially horizontal portion near its lower end with an elongated, flanged groove in the bottom thereof in which said stoppers are slidably supported by their cap-like flanges; means holding said lower end substantially stationary with respect to said frame and spaced a predetermined distance above the upper surface of said conveyor; means for imparting vibratory movement to the upper end of said feeding means and a stop at the lower end of said feeding means; indexing means adjacent to said conveyor and adapted for momentarily holding said bottles on said upper surface at a selected point under the horizontal portion of said feeding means; a vertically reciprocable ram positioned directly above said selected point for driving said stoppers, one at a time, downwardly out of said groove; said means effecting downward movement of said ram at a time when a bottle is held stationary at said selected point.

6. In a device for automatically inserting stoppers comprised of a resilient material, and each having a laterally extending, cap-like flange at its upper end, into successive bottles, the combination comprising: a frame; a horizontally movable, straight line conveyor supported by said frame; an inclined feeding means having a substantially horizontal portion near its lower end comprising a pair of laterally spaced, U-shaped members opening towards each other for simultaneously engaging said cap-like flange; means holding said lower end substantially stationary with respect to said frame and spaced a predetermined distance above the upper surface of said conveyor; means for imparting vibratory movement to the upper end of said feeding means and a stop at the lower end of said feeding means; indexing means adjacent to said conveyor and adapted for momentarily holding each of said bottles on said upper surface at a selected point under the horizontal portion of said feeding means; a vertically reciprocable ram positioned directly above said selected point for driving said each stopper downwardly out of said U-shaped members; and means effecting downward movement of said ram at a time when a bottle is held at said selected point.

7. In a device for automatically inserting stoppers into successive bottles, said stoppers being of a resilient material, and each having a shank and a laterally extending, cap-like flange at its upper end, the combination comprising: a frame; a horizontally movable conveyor supported by said frame; an inclined feeding means having a substantially horizontal portion near its lower end with an elongated, flanged slot in the bottom thereof in which said stoppers are releasably supported by their flanges; means holding said lower end against movement with said conveyor, substantially stationary with respect to said frame and spaced a predetermined distance above the upper surface of said conveyor, said predetermined distance being greater than the height of one of said bottles plus the length of the shank of one of said stoppers and less than the height of one of said bottles plus the length of the shank of one of said stoppers plus the downward movement of said stopper permitted by the resiliency of said stopper flanges without losing the guiding of said one of said stoppers by said feeding means; means adapted for imparting vibratory movement to the upper end of said feeding means and a stop at the lower end of said feeding means; a pair of star wheels positioned one on each side of said conveyor and comprising indexing means adapted for momentarily holding said bottles on said upper surface at a selected point under the horizontal portion of said feeding means; a vertically reciprocable ram positioned directly above said selected point for driving each stopper downwardly out of said slot; and means effecting downward movement of said ram at a time when a bottle is held at said selected point.

8. In a device for automatically inserting stoppers comprised of a resilient material, and each having a laterally extending, cap-like flange at its upper end, into successive bottles, the combination comprising: means providing a bottle supporting surface; an inclined chute having a substantially horizontal portion near its lower end with an elongated, undercut slot in the bottom thereof; means holding said lower end at a constant, predetermined distance above said surface, said surface being movable with respect to said lower end in a direction parallel with said surface; means adapted for imparting vibratory movement to the upper end of said chute and a stop at the lower end of said chute; indexing means adjacent said bottle supporting surface and adapted for momentarily holding said bottles against movement with said bottle supporting surface and at a selected point with respect to said lower end of said chute; a vertically reciprocable ram positioned directly over said selected point for driving each stopper downwardly out of said slot; and means effecting downward movement of said ram at a time when a bottle is held at said selected point.

9. In a device for automatically inserting stoppers comprised of a resilient material, and each having a shank and a laterally extending, cap-like flange at its upper end, into successive bottles, the combination comprising: a frame; a horizontally movable conveyor supported by said frame; an inclined chute having a substantially horizontal portion near its lower end with an elongated, flanged slot in the bottom thereof for supporting said stoppers by their cap-like flanges; means holding said lower end substantially stationary with respect to said frame and spaced a constant, predetermined distance above the upper surface of said conveyor; means adapted for imparting vibratory movement to the upper end of said chute and a stop at the lower end of said chute; a vertically reciprocable ram positioned directly above said slot and said surface for driving each stopper downwardly out of said slot; means effecting downward movement of said ram at a time when a bottle is held stationary below said ram; the spacing between said bottle and said chute being less than the length of the shank of one of said stoppers plus the downward movement of said stopper permitted by the flexure of the flange of said stopper without disengagement from said chute and greater than the length of the shank of one of said stoppers.

10. In a device for automatically inserting stoppers into a plurality of bottles, said stoppers each comprising a resilient material and having a laterally extending, cap-like, resiliently flexible flange at their upper ends, said bottles being delivered successively to a station point, the combination comprising: a frame; a chute having an elongated slot in its bottom, said chute being inclined downwardly through one portion thereof and having its lower end positioned substantially horizontally, a receiver adjacent the lower end of said chute and held rigidly with respect to said frame, said receiver having a first opening therein so shaped and aligned with said chute that said first opening constitutes substantially a continuation of the slot in said chute; a wall across said first opening constituting an end thereof and a second opening through the top of said receiver adjacent said wall and communicating with said first opening; means feeding stoppers serially into said chute in such a manner that said stoppers are supported by their flanges on the bottom thereof and the body parts of said stoppers extend through said elongated slot; means for continuously imparting vibration to said chute; a vertically reciprocable ram positioned adjacent said wall and above said second opening in said receiver, and so positioned that its axis extended passes through said station point, said ram being of substantially the diameter of the body part of one of said stoppers but less than the diameter of said second opening and less than the width of that portion said first opening which is directly below said ram; whereby a stopper can be conducted along said chute to a position in alignment with the mouth of a selected bottle and the ram can push said stopper from said chute directly into said bottle, the flanges of said stopper yielding under pressure from the ram to permit said stopper to be pushed past said supporting flanges and into said bottle.

11. In a device for automatically inserting stoppers into a plurality of bottles, which stoppers have radially extending, flexible flanges at their respective upper ends and said bottles being successively fed to a station point, the combination comprising: an elongated trough-like feeding means having an elongated slot intermediate a pair of rigid, parallel, supporting flanges, said feeding means having a feeding end and a discharge end and said feeding means having a stop adjacent the discharge end of said feeding means and said supporting flanges extending from the feeding end substantially to the discharge end of said feeding means, said parts being adapted for receiving the stoppers serially into the feeding end of said feeding means in such a manner that said stoppers are supported by their flanges on said supporting flanges and the body parts of said stoppers extend through said elongated slot throughout their entire path of travel to, and above, said station point; a reciprocable ram positioned perpendicular to the lengthwise extent of said supporting flanges, with its axis extended passing through said station point, adjacent said stop and above said elongated slot, said ram being of diameter less than the width of that portion of said slot directly opposite said ram; whereby a stopper can be conducted along said feeding means to a position in alignment with the mouth of a selected bottle and the ram can push said stopper from said feeding means directly into said bottle, the flanges of said stopper yielding under pressure from the ram as said stopper is pushed between said supporting flanges and into said bottle.

12. In a device for automatically inserting stoppers into a plurality of bottles, said stoppers having laterally extending, cap-like resilient flanges at their respective upper ends and said bottles being successively delivered to a station point, the combination comprising: a chute having an elongated slot intermediate a pair of horizontally extending, parallel, substantially rigid supporting flanges and said supporting flanges extending from the feeding and substantially to the discharge end of said chute, at least one end of said slot terminating intermediate the ends of said chute, said chute being adapted for receiving stoppers therein and permitting them to move therealong with the shanks of said stoppers extending through said slot and the flanges of said stoppers being supported on and by said supporting flanges throughout their entire path of travel to, and above, said station point, and said one end of said slot being positioned with respect to said station point so that movement of a stopper will be arrested when the axis extended of said stopper will pass substantially through said station point; a reciprocable ram positioned with its axis extended passing through said station point and above said slot perpendicular to the lengthwise extent of said supporting flanges, the diameter of said ram being substantially equal to the diameter of the shanks of said stoppers, whereby a stopper can be conducted along said chute to a position in alignment with the mouth of a selected bottle and the ram can push said stopper from said chute directly into said bottle, the flanges of said stopper yielding under pressure from the ram as said stopper is pushed between said supporting flanges and into said bottle.

13. In a device for automatically inserting stoppers into a plurality of bottles, said stoppers having laterally extending, cap-like flanges at their respective upper ends and said bottles being successively fed to a station point, the combination comprising: an elongated trough-like feeding means having an elongated slot intermediate a pair of parallel supporting flanges, said feeding means having a feeding end and a discharge end and said feeding means having a stop adjacent the discharge end of said feeding means for limiting the movement of stoppers therethrough and said supporting flanges extending from the feeding end substantially to the discharge end of said feeding means; means feeding stoppers serially into the feeding end of said feeding means in such a manner that said stoppers are supported by their flanges on said supporting flanges and the body parts of said stoppers extend through said elongated slot throughout their entire path of travel to, and above, said station point; a reciprocable ram positioned perpendicular to the lengthwise extent of said supporting flanges, with its axis extended passing through said station point, adajcent said stop and above said elongated slot; one of the (1) stopper flanges and (2) supporting flanges being of resilient material; a support for a bottle to be stoppered, said support being spaced below the bottom of said feeding means a distance equal to the height of the bottle plus a clearance distance which is greater than the distance the body parts of said stoppers extend below said feeding means but which clearance distance is less than the distance said stoppers extend below the bottom of said feeding means when they are pushed by said ram sufficiently through said slot that they are no longer effectively guided by said supporting flanges; whereby a stopper can be conducted along said feeding means to a position in alignment with the mouth of a selected bottle and the ram can push said stopper from said feeding means directly into said bottle, the said resilient ones of said flanges yielding under pressure from the ram as said stopper is pushed between said supporting flanges and into said bottle.

14. In a device for automatically inserting stoppers into a plurality of bottles, said stoppers having a laterally extending, resiliently flexible, cap-like flange at their respective upper ends and said bottles being successively fed to a station point, the combination comprising: an elongated trough-like feeding means having an elongated slot intermediate a pair of parallel, rigid, supporting flanges, said feeding means having a feeding end and a discharge end and said feeding means having a stop closing the end of said slot adjacent the discharge end of said feeding means and said supporting flanges extending substantially continuously from the feeding end to the discharge end of said feeding means, said feeding means being adapted for receiving stoppers thereinto in such a manner that said stoppers are supported by their flanges on said supporting flanges and the body parts of said stoppers extend through said elongated slot throughout their entire path of travel and above said station point; a reciprocable ram positioned perpendicular to the lengthwise extent of said supporting flanges, with its axis extended passing through said station point, adjacent said stop and above said elongated slot, said ram being of diameter not materially less than the diameter of the body part of said stoppers but less than the width of that portion of said slot directly opposite said ram; a support for a bottle to be stoppered, said support being spaced below the bottom of said feeding means a distance equal to the height of the bottle plus a clearance distance which is greater than the distance the body parts of said stoppers extend below said feeding means but which clearance distance is less than the distance said stoppers extend below the bottom of said feeding means when they are pushed by said ram sufficiently through said slot that they are no longer effectively guided by said supporting flanges; whereby a stopper can be conducted along said feeding means to a position in alignment with the mouth of a selected bottle and the ram can push said stopper from said feeding means directly into said bottle, the flanges of said stopper yielding under pressure from the ram as said stopper is pushed between said supporting flanges and into said bottle.

15. In a device for automatically inserting stoppers into a plurality of bottles, said stoppers having a laterally extending, cap-like, resilient flange at their respective upper ends and said flanges being of greater radial width than axial thickness and said bottles being successively delivered to a station point, the combination comprising: a chute having an elongated slot intermediate a pair of horizontally extending, parallel, substantially rigid supporting flanges and said supporting flanges extending substantially continuously from the feeding end to the discharge end of said chute, at least one end of said slot terminating intermediate the ends of said chute; said chute being adapted for receiving stoppers therein and permitting them to move therealong with the shanks of said stoppers extending through said slot and the flanges of said stoppers being supported on and by said supporting flanges throughout their entire path of travel and above said station point, and said one end of said slot being positioned with respect to said station point so that movement of a stopper toward said end will be arrested when the axis extended of said stopper will pass substantially through said station point; a reciprocable ram positioned with its axis extended passing through said station point and above said slot, the diameter of said ram being substantially equal to the diameter of the shanks of said stoppers, but not greater than the width of said slot less twice the thickness of the stopper flanges; whereby a stopper can be conducted along said chute to a position in alignment with the mouth of a selected bottle and the ram can push said stopper from said chute directly into said bottle, the flanges of said stopper yielding under pressure from the ram as said stopper is pushed between said supporting flanges and into said bottle.

16. In a device for automatically inserting stoppers into a plurality of bottles, said stoppers having radially extending, cap-like flanges at their respective upper ends and said bottles being successively fed to a station point, the combination comprising: an elongated trough-like feeding means having an elongated slot intermediate a pair of parallel supporting flanges, said feeding means having a feeding end and a discharge end and said feeding means having a stop closing the end of said slot adjacent the discharge end of said feeding means and said supporting flanges extending substantially continuously from the feeding end to the discharge end of said feeding means, said feeding means being adapted for receiving stoppers in such a manner that said stoppers are supported by their flanges on said supporting flanges and the body parts of said stoppers extend through said elongated slot throughout their entire path of travel and above said station point; a reciprocable ram positioned perpendicular to the lengthwise extent of said supporting flanges, with its axis extended passing through said station point, adjacent said stop and above said elongated slot, said ram being of diameter not materially less than the diameter of the body part of one of said stoppers but less than the width of that portion of said slot directly opposite said ram; one of the (1) stopper flanges and (2) supporting flanges being of resilient material; a support for a bottle to be stoppered, said support being spaced below the bottom of said feeding means a distance equal to the height of the bottle plus a clearance distance which is greater than the distance the body parts of said stoppers extend below said feeding means but which clearance distance is less than the distance said stoppers extend below the bottom of said feeding means when they are pushed by said ram sufficiently through said slot that they are no longer effectively guided by said supporting flanges; whereby a stopper can be conducted along said feeding means to a position in alignment with the mouth of a selected bottle and the ram can push said stopper from said feeding means directly into said bottle, the resilient ones of said flanges yielding under pressure from the ram as said stopper is pushed between said supporting flanges and into said bottle.

17. In a device for automatically inserting stoppers comprised of a resilient material of substantially high, and variable, coefficient of friction, and each having a laterally extending, resiliently flexible, cap-like flange at its upper end, into successive bottles, the combination comprising: a frame; an inclined, elongated, feeding means having a substantially horizontal portion near its lower end with elongated rails along the bottom thereof for simultaneously engaging said cap-like flange; a horizontal, straight-line conveyor supported by said frame for movement with respect to said lower end; means holding said lower end spaced a predetermined, constant distance above the upper surface of said conveyor; means for agitating the upper end of said feeding means and a stop at the lower end of said feeding means; indexing means adjacent said conveyor and adapted for arresting and momentarily holding said bottles on said upper surface at a selected point under the horizontal portion of said feeding means; a vertically reciprocable ram positioned directly above said horizontal portion and said selected point for driving said stoppers downwardly between said rails; and means effecting downward movement of said ram at a time when a bottle is held at said selected point.

18. In a device for automatically inserting stoppers into successive bottles, said stoppers being of a resilient material, and each having a shank and a laterally extending, cap-like flange at its upper end, the combination comprising: a frame; a horizontally movable conveyor supported by said frame; an inclined feeding means having a substantially horizontal portion near its lower end with an elongated, flanged slot in the bottom thereof for slidably supporting said stoppers by their flanges; means holding said lower end spaced a predetermined, constant distance above the upper surface of said conveyor, said predetermined distance being greater than the height of one of said bottles plus the distance which said stoppers extend below said horizontal portion when slidably supported within said slot, and less than the height of one of said bottles plus the distance which said stoppers can extend below said horizontal portion while remaining guidingly engaged by said flanges of said slot as said one of said stoppers is being urged downwardly therefrom; means adapted for imparting vibratory movement to the upper end of said feeding means and a stop at the lower end of said feeding means; a pair of star wheels positioned one on each side of said conveyor and comprising indexing means adapted for arresting and momentarily holding said bottles on said upper surface at a selected point under the horizontal portion of said feeding means; a vertically reciprocable ram positioned directly over said selected point for urging each stopper downwardly out of said slot; and means effecting downward movement of said ram at a time when a bottle is at said selected point.

19. The device defined in claim 1 wherein said feeding means comprises a part held substantially stationary with respect to the frame of the device and a part which is relatively movable with respect thereto; said relatively stationary part has a groove in its lower side and a pair of flanges extending toward each other from the lower extremities of the walls of said groove, the opposed edges of said flanges being spaced from each other a distance greater than the diameter of the body part of the stoppers and less than the diameter of the flanges of said stoppers, an opening through said stationary part adjacent to said stop and on a center passing through the center of said groove, said opening being adapted for the passage therethrough of said ram; means affixed to the relatively movable part of said feeding means for applying vibratory movement thereto, said stoppers being advanced from said movable part to said stationary part without material obstruction and without transmitting a material amount of said vibratory movement from said movable part to said stationary part.

20. The device defined in claim 5 wherein said feeding means comprises said horizontal portion held substantially stationary with respect to the frame of the device and a part which is relatively movable with respect to said frame; said flanges of said groove are spaced from the bottom of said groove a distance slightly greater than the thickness of the stopper flanges, the opposed edges of said groove flanges are spaced from each other a distance greater than the diameter of the body of the stoppers below said flanges and less than the diameter of the flanges of said stoppers, an opening extends through said stationary portion adjacent to said stop and on a center passing through the center of said groove, said opening being adapted for the passage therethrough of said ram; and means is affixed to the relatively movable part of said feeding device for applying vibratory movement thereto, said stoppers being transferred from said movable part to the stationary portion without material obstruction and without transmitting a material amount of vibratory movement from said movable part to said stationary portion.

21. In an automatic device for inserting flanged stoppers successively into a plurality of bottles which are successively presented to a selected station point on a surface, the combination comprising: an elongated, horizontally extending chute having longitudinally arranged flanges for engaging the flanges of the stoppers and permitting the stopper shanks to extend between said chute flanges, one end of said chute being substantially horizontal and having said chute flanges on the upper side thereof and said chute being twisted intermediate its ends to position said chute flanges on the under side thereof at its other end, said other end of said chute being substantially parallel with said surface; means feeding stoppers serially and horizontally into said one end of said chute and simultaneously applying thereto a vibration with respect to said surface; a receiver affixed rigidly with respect to said station point for serially receiving stoppers from said other end of said chute and means limiting the passage of stoppers therethrough at a predetermined point which predetermined point is vertically above said station point; a ram supported for longitudinal reciprocation with respect to, and on an axis perpendicular to, said surface and through said predetermined point; and said surface being spaced from said chute flanges a distance greater than the height of the bottles.

22. In an automatic device for inserting flanged stoppers successively into a plurality of bottles which are successively presented to a selected station point on a surface, the combination comprising: an elongated, horizontally extending chute having longitudinally arranged flanges for engaging the flanges of the stoppers and permitting the stopper shanks to extend between said chute flanges, a first end of said chute being substantially horizontal and having said chute flanges on the upper side thereof and said chute being twisted intermediate its ends to position said chute flanges on the under side thereof at its second end, said second end of said chute being substantially parallel with said surface; means feeding stoppers serially and horizontally into said first end and simultaneously applying thereto a vibration with respect to said surface; means positively stopping the travel of said stoppers serially at the second end of the chute; and means including a reciprocable ram for driving said stoppers successively into said successively presented bottles without further change in the axial alignment of said stoppers.

23. In an automatic device for inserting flanged stoppers successively into a plurality of bottles which are successively presented to a selected station point on a surface, the combination comprising: an elongated, horizontally extending chute having longitudinally arranged flanges for engaging the flanges of the stoppers and permitting the stopper shanks to extend between said chute flanges, a first end of said chute being substantially horizontal and having said chute flanges on the upper side thereof and said chute being twisted intermediate its ends to position said chute flanges on the under side thereof at its second end, said second end of said chute being substantially parallel with said surface; means feeding stoppers serially and horizontally into said first end and simultaneously applying thereto a vibration with respect to said surface; a resilient support for said second end of said chute, the direction of its resiliency being in the same general direction as the center line of said chute, and means limiting the passage of stoppers therethrough at a predetermined point which predetermined point is vertically above said station point; a ram supported for longitudinal reciprocation with respect to, and on an axis perpendicular to, said surface and through said predetermined point; and said surface being spaced from said chute flanges a distance greater than the height of the bottles.

24. In an automatic device for inserting flanged stoppers successively into a plurality of bottles which are successively presented to a selected station point on a surface, the combination comprising: an elongated, horizontally extending chute having longitudinally arranged flanges for engaging the flanges of the stoppers and permitting the stopper shanks to extend between said chute flanges, a first end of said chute being substantially horizontal and having said chute flanges on the upper side thereof and said chute being twisted intermediate its ends to position said chute flanges on the under side thereof at its second end, the second end of said chute being substantially parallel with said surface; means feeding stoppers serially and horizontally into said first end and simultaneously applying thereto a vibration with respect to said surface; a resilient support for said second end of said chute, the direction of its resiliency being in the same general direction as the center line of said chute; means positively stopping the travel of said stoppers serially at said second end of the chute; and means including a reciprocable ram for driving said stoppers successively into said successively presented bottles without further change in the axial alignment of said stoppers.

25. In an automatic device for inserting flanged stoppers successively into a plurality of bottles which are successively presented to a selected station point on a surface, the combination comprising: an elongated, horizontally extending chute having longitudinally arranged flanges for engaging the flanges of the stoppers and permitting the stopper shanks to extend between said chute flanges, a first end of said chute having said chute flanges on the upper side thereof and said chute being twisted intermediate its ends to position said chute flanges on the under side thereof at its second end, the second end of said chute being substantially parallel with said surface; means feeding stoppers serially into said first end and simultaneously applying thereto a vertical and horizontal, oscillatory high frequency vibration with respect to said surface; receiver including a passageway of the same cross-section as said chute affixed for serially receiving stoppers from the second end of said chute and means limiting the passage of stoppers therethrough at a predetermined point; a ram supported for longitudinal reciprocation with respect to, and on an axis perpendicular to, said surface and through said predetermined point, said ram being of less diameter than the space between said chute flanges; and said surfaces being spaced from said chute flanges a distance greater than the height of the bottles.

26. In an automatic device for inserting flanged stoppers successively into a plurality of bottles which are successively presented to a selected station point on a surface, the combination comprising: an elongated, horizontally extending chute having longitudinally arranged flanges for engaging the flanges of the stoppers and permitting the stopper shanks to extend between said chute flanges, a first end of said chute having said chute flanges on the upper side thereof and said chute being twisted intermediate its ends to position said chute flanges on the under side thereof at its second end, the second end of said chute being substantially parallel with said surface; means feeding stoppers serially into said first end and simultaneously applying thereto a vertical and horizontal, oscillatory high frequency vibration with respect to said surface; means receiving and stopping said stoppers serially at said second end of the chute; and means including a reciprocable ram for driving said stoppers successively into said successively presented bottles.

27. In a device for automatically inserting stoppers into a plurality of bottles successively presented to an insertion station, each stopper having a laterally extending flange spaced from the lower end thereof, the combination comprising: an elongated transfer chute having a pair of substantially uniformly spaced rails disposed lengthwise thereof, said chute having a receiving end and a discharge end; means for feeding said stoppers into the receiving end of said chute between said rails thereof, said flanges being engageable by said rails for guiding said stoppers; a positioning means disposed above said station at a substantially fixed lateral distance from said discharge end for receiving said stoppers from said discharge end, said positioning means engaging said flanges for releasably supporting said stoppers in insertion position; insertion means disposed above said positioning means for movement toward and away from said station; actuating means for moving said insertion means downwardly to release said stoppers successively from said positioning means, one of the (1) flanges and (2) positioning means being of resilient material; and a bottle support under said insertion station and spaced below said discharge end a substantially constant distance slightly greater than the height of said bottles plus the depending extent of said stopper from said positioning means, said flanges being engaged by said positioning means until said insertion is at least partially accomplished, and the resilient one of said flanges and positioning means yielding as they are disengaged from each other in response to movement of said insertion means.

28. The structure of claim 27 wherein said chute extends away from said feeding means in a generally horizontal direction, and said stoppers are supported within said chute near its discharge end by interengagement of said flanges and said rails.

29. The structure of claim 27 wherein said chute extends laterally away from said feeding means and is twisted about its lengthwise axis, said rails being on the upper side of said chute at its receiving end and on the lower side of said chute at its discharge end.

30. The structure of claim 27 wherein the operation of said actuating means is responsive to movement of said bottles through said insertion station.

31. A device for automatically inserting stoppers into a plurality of bottles successively presented to an insertion station, each stopper having a portion of enlarged diameter spaced from the lower end thereof, the combination comprising: an elongated transfer chute having a pair of substantially uniformly spaced rails disposed lengthwise thereof, said chute having a receiving end and a discharge end, said receiving end being adapted for receiving said stoppers between said rails of said chute, and said portions of enlarged diameter being engageable by said rails for guiding said stoppers; resilient positioning means disposed at a substantially fixed lateral distance from said discharge end for receiving said stoppers from said discharge end and releasably supporting said stoppers in insertion position; insertion means disposed adjacent to said positioning means for movement toward and away from said insertion station, movement of said insertion means toward said insertion station causing said positioning means to release, successively, said stoppers from their engagement by said positioning means; and a bottle support at said insertion station for holding said bottles spaced from the retracted position of said insertion means a distance slightly greater than the length of said stopper extending from said positioning means toward said bottle support, said portions of enlarged diameter being engaged by said positioning means until said insertion is at least partially accomplished, said positioning means yielding as said stopper is urged into said botle in response to movement of said insertion means.

32. In a device for automatically inserting stoppers into a plurality of bottles successively presented to an insertion station, each stopper having a portion of enlarged diameter spaced from the lower end thereof, the combination comprising: an elongated transfer chute having a pair of substantially uniformly spaced rails disposed lengthwise thereof, said chute having a receiving end and a discharge end; means for feeding said stoppers into the receiving end of said chute between said rails thereof, said portions of enlarged diameter being engageable by said rails for guiding said stoppers; a positioning means disposed above said station in a fixed lateral position with respect to said discharge end for receiving said stoppers serially from said discharge end, said positioning means engaging said portions of enlarged diameter for releasably supporting said stoppers in insertion position; insertion means disposed above said positioning means for movement toward and away from said insertion station; actuating means for moving said insertion means downwardly to release said stoppers successively from said positioning means, one of the (1) portions and (2) positioning means being of resilient material; and a bottle support under said insertion station and spaced below said discharge end a constant distance slightly greater than the height of said bottles plus the depending extent of a said stopper from said positioning means, said portions of enlarged diameter being engaged by said positioning means until said insertion is at least partially accomplished, and the resilient one of said portions and positioning means yielding as they are disengaged from each other in response to movement of said insertion means.

33. In a device for automatically inserting stoppers into a plurality of bottles successively presented to an insertion station, each stopper having a laterally extending, enlarged portion spaced from the lower end thereof, the combination comprising: an elongated transfer chute having a pair of substantially uniformly spaced rails disposed lengthwise thereof, said chute having a receiving end and a discharge end; means for feeding said stoppers into the receiving end of said chute between said rails thereof; a positioning means disposed above said station at a substantially fixed, lateral distance from the discharge end of said chute for receiving said stoppers from said discharge end, said positioning means engaging said enlarged portions for releasably supporting said stoppers in insertion position; insertion means disposed above said positioning means for movement toward and away from said station; actuating means for moving said insertion means downwardly to release said stoppers successively from said positioning means, one of the (1) enlarged portions and (2) positioning means being of resilient material; and a bottle support under said insertion station and spaced below said discharge end a substantially constant distance slightly greater than the height of said bottles plus the depending extent of said stopper from said positioning means, said enlarged portions being engaged by said positioning means until said insertion is at least partially accomplished, and the resilient one of said enlarged portions and positioning means yielding as they are disengaged from each other in response to movement of said insertion means.

34. In an automatic device for inserting stoppers having a relatively wide portion and a shank below said wide portion, successively into a plurality of containers which are successively presented to a selected station point, the combination comprising: an elongated, horizontally extending track having longitudinally arranged rails for engaging the wide portions of the stoppers and permitting the stopper shanks to extend between said rails, a first end of said track having said rails on the upper side thereof and said track being twisted intermediate its ends to position said rails on the under side thereof at its second end, the second end of said track being substantially perpendicular to the axes of said bottles; means feeding stoppers serially into said first end and simultaneously applying thereto a vertical and horizontal, oscillatory, high frequency vibration with respect to said surface; means receiving and stopping said stoppers serially at said second end of the track; and means including a reciprocable ram for driving said stoppers successively into said successively presented containers.

35. In an automatic device for inserting flanged stoppers successively into a plurality of bottles which are successively presented to a selected station point on a surface, the combination comprising: an elongated chute having horizontally extending end portions and longitudinally arranged chute flanges for engaging the flanges of the stoppers and permitting the stopper shanks to extend between said chute flanges, a first end of said chute having said chute flanges on the upper side thereof, said chute flanges being on the under side thereof at its second end, the second end of said chute being substantially parallel with said surface; means feeding stoppers serially into said first end and simultaneously applying thereto a vertical and horizontal, oscillatory, high frequency vibration with respect to said surface; means receiving and stopping said stoppers serially at said second end of the chute; and means including a reciprocable ram for driving said stoppers successively into said successively presented bottles.

36. In a device for automatically inserting stoppers into a plurality of bottles being fed successively to a stoppering station, said stoppers having laterally extending, resilient portions spaced from their lower ends, the combination comprising: an elongated, trough-like feeding means having an elongated slot intermediate a pair of parallel, supporting rails, said feeding means having a feeding end and a discharge end and having a stopper blocking device at the discharge end of said feeding means; means feeding stoppers serially into the feeding end of said feeding means so that the body part of said stoppers extends between said rails and said stoppers are supported by their respective, laterally extending portions upon and between said rails near the discharge ends thereof; a reciprocable ram positioned adjacent to said blocking device and above said slot, with the extended axis of said ram passing through said station, said ram being of substantially the diameter of the body part of one of said stoppers but less than the width of that portion of said slot directly opposite said ram; whereby, with a stopper supported on its laterally extending portion by said rails and positioned coaxially with said ram, and a bottle located at said station, the ram, in moving toward said station, will engage said stopper and drive it off, and between, said rails and into said bottle, the laterally extending portions of said stopper being distorted by said rails as said ram urges said stopper therebetween.

References Cited in the file of this patent
UNITED STATES PATENTS

| | | |
|---|---|---|
| 2,015,913 | Sydow et al. | Oct. 1, 1935 |
| 2,180,836 | Risser | Nov. 21, 1939 |
| 2,299,394 | Jolly | Oct. 20, 1942 |
| 2,363,014 | Nicolle | Nov. 21, 1944 |
| 2,696,285 | Zenlae | Dec. 7, 1954 |

FOREIGN PATENTS

| | | |
|---|---|---|
| 307,925 | Great Britain | Apr. 3, 1930 |
| 525,201 | Great Britain | Aug. 23, 1940 |

U. S. DEPARTMENT OF COMMERCE
PATENT OFFICE

CERTIFICATE OF CORRECTION

Patent No. 2,797,541                                    July 2, 1957

Leonard T. Cookson

It is hereby certified that error appears in the printed specification of the above numbered patent requiring correction and that the said Letters Patent should read as corrected below.

Column 5, line 46, for "point 68" read -- point 69 (Figure 6); line 48, for "point 69 that a stopper whose flange E is contacting said" read -- point 69. Cutouts 93 and 94 (Figure 10) are --; column 9, line 28, after "distance" insert -- the --; column 17, line 50, before "receiver" insert -- a --; line 58, for "surfaces" read -- surface --.

Signed and sealed this 25th day of February 1958.

(SEAL)

Attest:
KARL H. AXLINE

Attesting Officer

ROBERT C. WATSON
Commissioner of Patents